Aug. 8, 1967     R. G. BOETTCHER     3,334,442

GLIDE DOOR MOUNTING

Filed Oct. 21, 1965

INVENTOR.
RUDOLF G. BOETTCHER
BY
*Watson D. Harbaugh*
ATT'Y

United States Patent Office 3,334,442
Patented Aug. 8, 1967

3,334,442
GLIDE DOOR MOUNTING
Rudolf G. Boettcher, Grand Haven, Mich., assignor to The Bastian-Blessing Company, Chicago, Ill., a corporation of Illinois
Filed Oct. 21, 1965, Ser. No. 499,871
11 Claims. (Cl. 49—231)

ABSTRACT OF THE DISCLOSURE

A frictionless rectilineal gliding support of elongated strip magnets repulsion oriented for weight bearing purposes and disposed to define a V-shape spacing between them having magnet repulsion vectors opposing and cushioning relative lateral movement.

---

The present invention relates to magnetic repulsion support of a moving element and particularly to gliding doors of the self-closing type associated with refrigerated and display cabinets in which food is preserved or kept fresh.

In the serving of food from a cabinet which is repeatedly opened to receive or supply food items, gliding doors have been employed which have been supported on roller bearings carried in spaced relationship by a rectilineal cage member with the doors disposed on overlapping, level, or inclined tracks by which they can pass each other when opened by hand and closed by hand or gravity. Although ball bearings are considered to be frictionless, such is not entirely true and to assure automatic door closing, the tracks are rather steeply inclined to overcome friction and any food debris that are always involved with the bearings in such installations. The steep inclination causes noise and requires substantial effort to operate. Moreover, the equipment is very hard to keep clean.

Although magnetic flux has been used heretofore to carry weight, such has not been vertically stable enough to eliminate the need for lateral contacting guides to hold the elements in cooperative relationship. Reference can be made to patents to Hansen 2,254,698 or Silverman 3,125,964, and it will be observed as a matter of physics that with the effort of magnetic flux varying with the square of the distance a guiding element is required to restrain horizonally disposed magnetic planes from slipping or yawing horizontally under the varying flux forces created by the slightest relative physical horizontal displacement and might and is repeatedly occurring in use. Opposite polarities attracting each other with such displacement and weight being borne by the opposing poles there is frictional seizing with the guide which can be worse than if the so-called frictionless bearings were employed originally. The friction of the guides is a very material problem and would entail a great deal more friction ultimately in operation than weight supporting ball bearings operating on a track having guiding components such as facing V grooves. Very little lateral play can be tolerated where doors are used to close openings of cabinets designed to preserve food.

The invention is characterized in the resulting effort of magnetic flux repelling fields disposed in weight bearing relationship so contrived that the effort of opposing fluxes is increased against lateral displacement in a degree greater than the increase of attracting fluxes if some physical displacement does occur.

One of the objects of the present invention is to provide a gliding door support which is frictionless supported magnetically against lateral movement as well as for longitudinal movement.

Another object of the invention is to provide a frictionless gliding door mounting by which the door is self-closing by gravity with a minimal degree of track incline for the conservation of the vertical space required for magnetic repulsion support elements.

A further object of the invention is to provide a magnetic flux repulsion gliding door mounting which opposes and recovers from any lateral displacement of the door by the hand of a person endeavoring to open or close the door.

These being among the objects and purposes of the invention other and further objects and desirable results will be understood from the description that follows and the geometry and arrangement of the parts shown in the drawings in which.

The inventive concept is essentially depicted in an arrangement in which the repelling faces of bar or strip magnets are arranged in pairs in a nestable vertically V-shaped opposing relationship with the center of flux concentrations of poles directly opposite each with the remote poles of the V-arrangement having one and the same polarity and the innermost poles at the apex having the same but the other polarity. In this connection it may be well to observe that the composite vectors of forces of the nested V-arrangement contemplates composite angle of approximately 120° with each of the two repulsion effects being directed upwardly to have a lateral component of 30° from the vertical and a vertical component 60° from the horizontal. The closer the centers of the opposing flux fields are, because of their weight bearing work effort, the less the angle of 30° can be within fifty percent, and the farther apart the magnets may ride because of a lesser weight burden. On the other hand the greater the work load the less that the angle of 60° can be, even as much as twenty-five percent less. It is preferred however to maintain the angles 30° and 60° by providing a flux field strength that is related to the work requirements in a relationship represented by the faces of the magnets being .625" wide and being spaced less than .0125" from each other.

Figure 1:
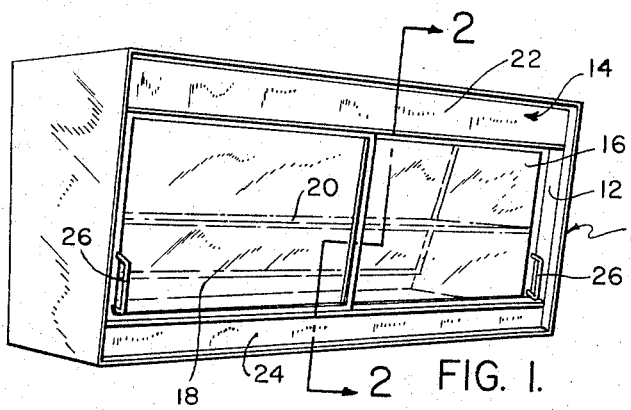
FIG. 1 is a perspective view of a display cabinet embodying the invention.

Referring now to the drawings in further detail, a slant front display cabinet 10 is shown in FIG. 1 having an access opening 12 in the front wall 14 closed by the doors 16 and 18 which are mounted for gliding overlapping movement in opposite directions to provide access to fruit, salads and desserts (not shown) upon the shelves 20 on the inside thereof. The cabinet has a head panel 22 and a foot panel 24 behind which the novel mountings for the doors are concealed and handles 26 are provided upon the remote stiles of the doors for manually opening the door in opposite directions.

Figure 4:
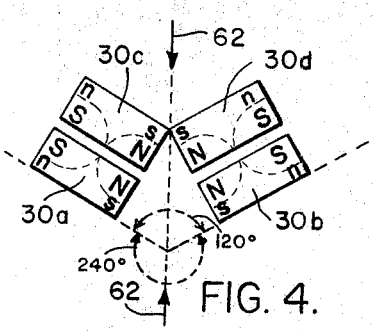
FIG. 4 is a diagrammatical showing of the polarity relationship of the magnetic strips employed in the invention.

Each door support (FIG. 2) comprises four like strips 30 of permanent magnet material, polarized and angularly arranged as noted in FIG. 4, with one pair of magnets 30a and 30b defining an included angle of approximately 120° and the other pair 30c and 30d movably coacting therewith and defining an obtuse angle of 240° nesting therein. Either pair of magnets (30a and 30b) or (30c and 30d) may be oriented uppermost and are provided with brackets 32 and 34 or 36 and 38 respectively, to support them in cooperating relation with respect to the doors and door frames respectively.

The brackets are non-magnetic and may be extrusions of plastic or metal of the shape shown or can be stainless steel sheet fabrications. Preferably, they will be of extrusions where the doors move on the level because the tracks will have uniform cross-sectional contour throughout. One bracket of each set, such as tracks 32 and 36, has flat areas 40 convergingly facing at a working angle 42 of 60° while the other brackets 34 and 38 has divergingly facing opposing areas 44 disposed at the same angle 42. The areas 44 are parallel to the areas 40 and are spaced a distance therefrom and oriented whereby the magnetic strips 30 may be secured thereto by epoxy or other suitable means coextensively within projections of each other with a weight bearing flux working space between them of approximately one-eighth of an inch.

Figure 2:
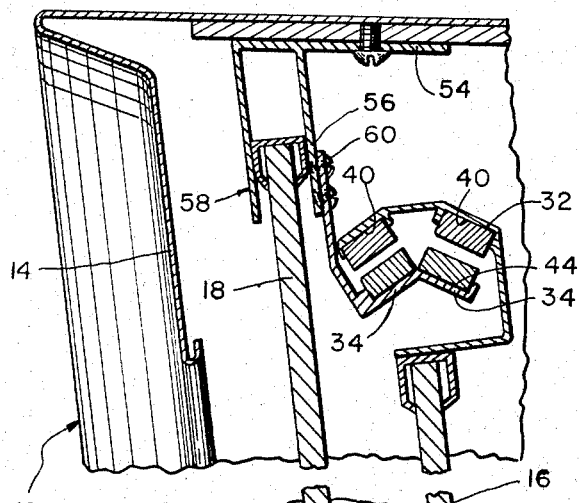
FIG. 2 is a vertical section taken on line 2—2 in FIG. 1 through the gliding doors and their self-closing mounting.

As shown in FIG. 2 spacers between the sill and lower bracket 38 are employed to provide the proper height and incline to the lower track 38 with a slideway 50 associated therewith deep enough to loosely guide and accommodate the adjacent free edge 52 of the door 16 for any depth required in its movement.

The upper support 54 can be the reverse of the lower, but preferably comprises a two-piece assembly in which the male bracket 44 is a separate member that can be adjustable vertical on a depending flange 56 of the guideway 58 to provide the inclination and height desired for the upper track as secured by screws 60, it being observed that the brackets are assymmetrically arranged so that the narrow guide portion for one door is associated with the wide magnetic support of the other door, thereby conserving front-to-back space.

Although the preferred angle of inclined movement of the doors is 2° from the horizontal, the tracks supporting the doors are oppositely inclined so that both doors will shut by gravity on their inclines. However, either or both tracks may be made level if the doors are desired to remain in positions they are left in by hand movement.

Furthermore, it is to be noted that both doors may be weight supported at either the top or bottom although, as a representative showing the doors are shown supported one at the top and the other at the bottom to demonstrate conservation of front-to-back cabinet space.

Figure 3:
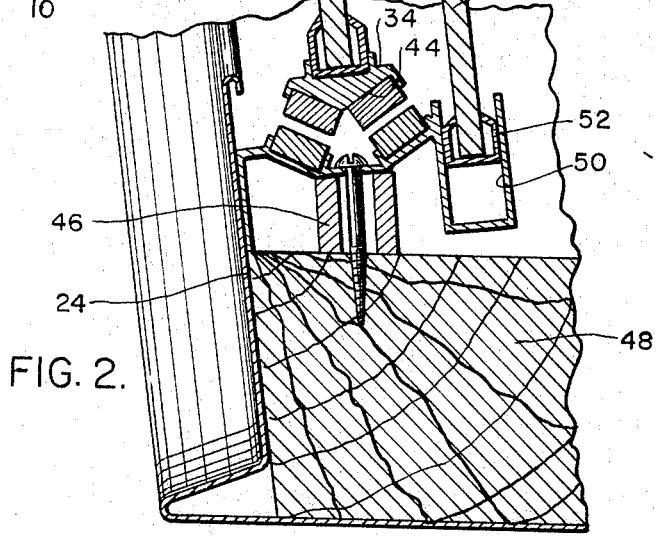
FIG. 3 is a view similar to FIG. 2 showing the mountings and doors as constructed for level opening and closing movement.
Figure 3:
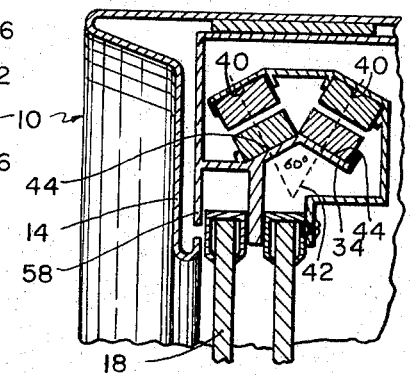
Figure 3:
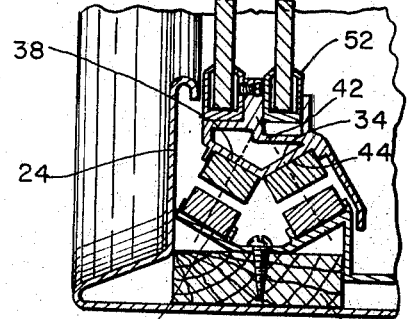

In FIG. 3, where the doors move on level supports, the arrangement is greatly simplified, the relatively gliding doors being supported sufficiently close to each other as to both come within the projected confines of the supporting magnetic assemblies and the lower magnetic tracks being exposed for thorough cleaning, like numerals referring to like members in understanding the function of the elements.

In both embodiments, it will be observed that the doors can be easily removed. The inner door is merely lifted at the top and moved inwardly, the lower edge clearing whatever guides are present after which the outer door is lifted and its lower edge moved inwardly until the upper edge is clear, whereupon it also can be removed outwardly. When this is done with the inclined tracks of FIG. 2, the doors should be close to their closed or lower position. It will be appreciated with the doors easily removed, all parts can be cleaned quickly and thoroughly, particularly for health reasons.

For both embodiments a sectional representative arrangement of the strip magnets is shown in FIG. 4 in which the preferred major polarity flux centers are noted by large letters N and S as located in accordance with the teachings of the invention, while the minor flux fields are shown in small letters $n$ and $s$.

It will be noted that when the magnets 30 are disposed and maintained in the orientation shown directly opposite each other in pairs with the load component oriented as shown by the arrows 62 with respect thereto which load is essentially vertical, the inner corners of the N poles of the lower magnets are farther apart than the N poles of the upper magnets. There is a horizontal spacing discrepancy between upper poles and the spacing of the lower poles which places the flux centers of the closer poles within the vertical projection of the flux centers of the wider poles. All four of these N poles repel one another. Thus, if there is a tendency for the closer magnets to move laterally in one direction, the magnet flux repulsion of the approaching N poles increases rapidly towards unity in relation to its square of the distance, while the receding N poles involve a flux repulsion change that decreases very rapidly. Therefore with slight relative lateral movement the differential in repulsion fluxes increases greatly and urges the magnets back to a balanced symmetrical position. This is true also of the S poles, both groups of poles cooperating to inhibit lateral movement of the strip magnets.

The significance of this can be better understood by a comparison, viz.

Compare this with the same magnetic strips facing each other in a common plane as projected directly above one another. Any slight lateral movement diminishes the repulsion effort of two vertically oriented magnetic flux fields and immediately begins to bring in the flux attraction of opposite poles which increases rapidly and feeds upon its own induced movement until some arresting physical contact is made with a guide some place. Such contact is under the frictional pressure of the attraction and would burden the system with friction which is sought to be avoided.

Although coplanar magnets may be provided with spacing discrepancies, it is to be observed that six of the poles are already disposed where flux attractions are a burden on the system the same as if lateral movement had already been induced in the preceding example and at least one of the remaining two poles is already in a repelling attitude upon the slightest lateral movement away from it.

One of the further advantages of the opposition of the magnets disposed at 120° in providing 100% opposition to lateral movement is that such provides a lateral tolerance which supports doors, which for any one of a number of purposes including design, are inclined appreciably from the vertical as much as 10°. However, the opposite edge of the door has to be supported laterally but at such a slight angle, the friction is quite minimal. In any event, there is less friction than with alternate mechanical mountings such as ball bearings and furthermore because of the resiliency or "bounce" of the magnetic repulsion support, any vibration, even imperceptible building vibrations, provides a planar movement component that works to free any frictional stoppage of a sliding movement that otherwise would be rectilineal alone.

Having thus described the inventive concept and two embodiments of glide doors which function with straight front or slant front cabinets, it will be appreciated how other and further modifications may be provided within the purposes and stated objects of the invention without departing from the spirit thereof within the scope of the appended claims.

I claim:

1. A glide support for rectilineal movement of doors comprising a supporting bracket, a supported bracket subject to gravitational forces and disposed above the supporting bracket, a plurality of elongated magnets extending substantially the length of door travel having magnetic flux fields of opposite polarity adjacent opposite edges with a major flux field effective on their front faces adjacent one edge, means supporting said magnets upon said brackets in parallel relationship with the front faces of magnets on one bracket opposite and facing front faces of magnets on the other bracket in pairs disposed on opposite sides of a median plane to which the pairs of opposing faces are inclined at an acute angle of approximately 60° to define an included angle of approximately 120° between said front faces on opposite sides of the median plane, each magnet in each pair of magnets being within a projection perpendicular to the face of the other magnet of its pair with the centers of magnetic flux of like polarity disposed directly opposite each other in both pairs.

2. A glide support for rectilineal movement of doors comprising a supporting bracket having longitudinal support faces disposed at an obtuse angle with respect to each other, a supported bracket disposed above the supporting bracket having longitudinal support faces disposed at the same angle, a plurality of cross-sectionally rectangular elongated magnets extending substantially the length of door travel having a front face and a back face, said magnets having magnetic flux fields of opposite polarity adjacent opposite edges effective upon their front faces, means supporting the back faces of said magnets upon said supported and supporting faces in parallel relationship with the front faces of the magnets on one bracket disposed directly opposite and facing the front faces of magnets on the other bracket in pairs disposed on opposite sides of a median plane to which the pairs of opposing faces are inclined from a perpendicular to said plane, with the centers of the magnetic flux fields of like polarity directly opposite each other in both pairs.

3. A glide support for rectilineal movement of doors comprising a supporting bracket, a supported bracket subject to gravitational forces and disposed above the supporting bracket, a plurality of elongated magnets extending substantially the length of door travel having magnetic flux fields of opposite polarity adjacent opposite edges effective on their front faces, means supporting said magnets upon said brackets in parallel relationship with the front faces of magnets on one bracket opposite and facing front faces of magnets on the other bracket in pairs disposed on opposite sides of a median plane to which the pairs of opposing faces are inclined at an acute angle whereby horizontal transverse movement of one bracket with respect to the other brings one pair of magnets closer together at their interfaces than the other pair of magnets at their interfaces, each magnet in each pair of magnets being within a projection perpendicular to the face of the other magnet of its pair with the centers of magnetic flux of like polarity disposed directly opposite each other in both pairs.

4. A glide support for rectilineal movement of doors comprising a supporting bracket having longitudinal support faces disposed transversely at an angle with respect to each other, a supported bracket disposed above the supporting bracket having longitudinal support faces disposed at the same angle, a plurality of cross-sectionally rectangular elongated magnets extending substantially the length of door travel having a front face and a back face, said magnets having magnetic flux fields of opposite polarity effective upon their front faces adjacent opposite edges, means supporting the back faces of said magnets upon said supported and supporting faces in parallel relationship with the front faces of the magnets on one bracket disposed directly opposite and facing the front faces of magnets on the other bracket in pairs disposed on opposite sides of a median plane to which the pairs of opposing faces are inclined from a perpendicular to said plane, the remote poles of magnetic flux in both pairs being of the same polarity and the adjacent poles of magnet flux being the same but of the opposite polarity, and means for applying the weight of the door as a compression load upon the pairs of magnets along a plane substantially bisecting said angle.

5. In a gliding magnetic flux support for rectilineal movement of doors the combination of four strip magnets arranged in pairs with the faces of the magnets extending substantially the length of door travel and being of each pair directly opposite and in close proximity with each other under working conditions and the interfaces of the two pairs providing an included angle coming within the range of 45° to 150° with the remote poles of magnetic flux of both pairs being of the same polarity and the adjacent poles of magnet flux being the same but of the opposite polarity, and means for applying a compression working load upon the pairs of magnets along a plane substantially bisecting said angle.

6. In a gliding magnetic flux support for rectilineal movement of doors the combination of four strip magnets arranged in pairs with the front faces of the magnets extending substantially the length of door travel and being of each pair being directly opposite each other at a distance between them of less than one-fifth the width of their front face, the interfaces of the two pairs providing an included angle of approximately 120°, each magnet having magnetic flux fields of opposite polarity adjacent opposite edges effective on their front faces, the remote poles of magnetic flux of both pairs being of the same polarity and the adjacent poles of magnet flux being the same but of the opposite polarity, and means for applying a compression load upon the pairs of magnets along a plane substantially bisecting said angle.

7. The combination called for in claim 2 in which the brackets are longitudinally inclined from the horizontal.

8. The combination called for in claim 2 in which the brackets are located at the top of a door.

9. The combination called for in claim 2 in which the brackets are located along the bottom of the door, and including a guide for the top edge of the door.

10. The combination called for in claim 9 in which the brackets are located at the top of a door, said brackets engaging the respective edges of its respective door and being located in part under the adjacent edges of the other door.

11. The combination called for in claim 2 in which said doors are disposed at a slant to the vertical and guide elements supporting the door edges remote from said brackets in said selected relationship.

References Cited
UNITED STATES PATENTS

| 2,908,539 | 10/1959 | White et al. | 49—453 X |
| 3,158,765 | 11/1964 | Polgreen | 104—148 |
| 3,175,254 | 3/1965 | Bromann | 49—228 |
| 3,276,166 | 10/1966 | Markus | 49—410 |

DAVID J. WILLIAMOWSKY, *Primary Examiner.*

KENNETH DOWNEY, *Examiner.*